United States Patent [19]
Poncelet et al.

[11] Patent Number: 5,972,831
[45] Date of Patent: Oct. 26, 1999

[54] INORGANIC TRANSPARENT PHOTOCATALYTIC COMPOSITION

[75] Inventors: Olivier J. Poncelet, Chalon sur Saone; Danielle M. Wettling, Chatenoy le Royal, both of France

[73] Assignee: Eastman Kodak Company, Rochester, N.Y.

[21] Appl. No.: 08/873,657

[22] Filed: Jun. 12, 1997

[30] Foreign Application Priority Data

Jun. 12, 1996 [FR] France .................................. 9607568

[51] Int. Cl.$^6$ ............................. B01J 25/00; B01J 23/02; C04B 35/10; C01B 33/26
[52] U.S. Cl. ............................ 502/304; 502/87; 502/240; 502/250; 502/302; 502/340; 502/341; 502/350; 502/351; 502/359; 501/153; 524/444; 423/328.1; 423/118.1; 423/115; 516/110
[58] Field of Search .............................. 502/87, 340, 341, 502/359, 350, 351, 302, 304, 240, 250; 501/153; 524/444; 423/328.1, 118.1, 155; 516/110; 252/600

[56] References Cited

U.S. PATENT DOCUMENTS

| | | | |
|---|---|---|---|
| 3,181,928 | 5/1965 | Frilette et al. | 23/2 |
| 4,152,404 | 5/1979 | Farmer | 423/327.1 |
| 4,241,035 | 12/1980 | Farmer | 423/327 |
| 4,252,779 | 2/1981 | Farmer | 423/327 |
| 4,394,253 | 7/1983 | Van Nordstrand | 208/251 H |
| 4,446,244 | 5/1984 | Van Nordstrand | 502/84 |
| 4,581,343 | 4/1986 | Blanchard et al. | 502/242 |
| 4,981,825 | 1/1991 | Pinnavaia et al. | 502/63 |
| 5,051,392 | 9/1991 | Mabilon et al. | 502/303 |
| 5,236,879 | 8/1993 | Inoue et al. | 502/73 |
| 5,541,096 | 7/1996 | Nomura et al. | 435/176 |
| 5,658,841 | 8/1997 | Tanaka et al. | 502/349 |
| 5,670,247 | 9/1997 | Takaoka et al. | 428/297 |
| 5,821,186 | 10/1998 | Collins | 501/12 |

FOREIGN PATENT DOCUMENTS

| | | | |
|---|---|---|---|
| 812619 | 12/1997 | European Pat. Off. | B01J 35/00 |
| 01218635 | 8/1989 | Japan | B01D 53/32 |
| 02268835 | 11/1990 | Japan | B01D 53/56 |
| 06246165 | 9/1994 | Japan | B01J 35/02 |
| 07088367 | 4/1995 | Japan | A23B 7/144 |
| 2261175 | 5/1993 | United Kingdom | B01J 21/16 |

*Primary Examiner*—Mark L. Bell
*Assistant Examiner*—Patricia L. Hailey
*Attorney, Agent, or Firm*—John R. Everett

[57] ABSTRACT

The present invention concerns a novel photocatalytic composition, a photocatalytic element and a novel method for the photocatalytic treatment of effluents, comprising a gaseous or aqueous solution of the organic compounds to be destroyed.

This novel photocatalytic composition consists of an inorganic gel comprising a photocatalyst and an aluminosilicate inorganic polymer binder of the Imogolite type.

This composition destroys organic compounds efficaciously.

11 Claims, No Drawings

INORGANIC TRANSPARENT PHOTOCATALYTIC COMPOSITION

The present invention concerns a novel photocatalytic composition, a photocatalytic element and a novel method for the photocatalytic treatment of effluents comprising organic pollutants in a gaseous or aqueous solution.

It has been known for some years that metallic oxides can be used to destroy, by means of photocatalytic oxidation, organic chemical compounds contained in aqueous or gaseous solutions. These methods of photocatalytic treatment are of great interest for the treatment of effluents, for example urban effluents (treatment of surface water or waste water), industrial effluents, etc, containing organic pollutants.

These treatment methods use heterogeneous photocatalytic systems in which pollutant organic compounds in an aqueous or gaseous solution are oxidised by radiation in the presence of a solid catalyst, generally a metallic oxide.

The metallic oxide most frequently used as a photocatalyst is titanium dioxide anatase.

The article Chem. Rev. 1995, 95, 735–758 describes the principle and the reaction mechanism of the photocatalyst on a surface of titanium dioxide, for the treatment of the gas or of the liquid solution containing organic pollutants. The dioxide used in these experiments can be in various forms, for example in the form of a colloid, a powder or monocrystals.

U.S. Pat. No. 5,275,741 describes a method for the photocatalytic treatment of pollutants in aqueous solution which consists of treating the mixture with radiation below 400 nm, in the presence of microspheres of $TiO_2$.

The use of carbon powder covered with titanium oxide is also known. This system improves the photodegradation of organic pollutants; however, this system has drawbacks owing to the absorption of light by the carbon, which leads to the formation of reactive centres on its surface and consequently the formation of irreversible bonds with some of the organic pollutants.

The article *Chem. Mater.* 1995, 446–453 describes a new category of photocatalysts which can be used to decontaminate liquids containing organic pollutants. In this article, photocatalysis is effected with a homogeneous dispersion of nanocrystals of $TiO_2$ in a organic modified $SiO_2$ matrix. The homogeneous system was prepared by means of a sol-gel process. According to this article such a system offers highly effective destruction of organic compounds in aqueous solution. It also enables systems to be produced in the form of blocks, membranes or layers.

However, the length of life of these systems is limited as the organic modified silicate matrix is itself sensitive to photo-oxidation and will end up being destroyed by the photocatalytic activity of the titanium dioxide in the presence of light.

This is why it is desirable to have available a photocatalytic compound capable of destroying, by photo-oxidation, organic compounds in aqueous solution and which resolves the problems mentioned with reference to the state of the art described above.

One of the objects of the invention is to provide a reusable photocatalytic composition having a length of life greater than that of the prior art.

A second object of the invention is to provide, from this composition, photocatalytic elements of different configurations, for example in the form of powders, flat elements, monoliths or fibers.

Another object of the invention is to provide a method for the photocatalytic treatment of effluents containing organic compounds to be destroyed in aqueous or gaseous solution, which is simple to implement and costs as little as possible.

DETAILED DESCRIPTION OF THE INVENTION

According to the present invention the problems mentioned above have been solved with a photocatalytic composition comprising at least one inorganic photocatalyst in an aluminosilicate inorganic polymer binder of the Imogolite type.

The photocatalytic composition of the present invention is totally inorganic and is thus particularly resistant to photo-oxidation.

The present invention also concerns a photocatalytic element which comprises a support covered with a layer of the catalytic composition of the invention.

The invention also concerns a method for destroying organic compounds in aqueous or gaseous solution which consists of putting the solution containing the organic compounds to be destroyed in contact with the photocatalytic compound of the invention.

In the context of the present invention a "photocatalytic composition" refers to a composition which has an oxidising activity catalysed by solar radiation (wavelength between 300 and 800 nm).

According to one embodiment, the photocatalytic composition is transparent to solar radiation, that is to say it transmits at least 50% of the emitted light with low refraction.

According to the invention the inorganic photocatalyst is an inorganic oxide having a photocatalytic activity, that is to say an oxide capable of destroying organic chemical compounds by oxidation reaction under the action of solar radiation. The photocatalyst of the invention is an inorganic oxide chosen from the metallic oxides, alkaline-earth oxides, actinide oxides and rare earth oxides.

The metallic oxides which can be used in the composition of the present invention are, for example, titanium dioxide, iron oxide, silver oxide, copper oxide, tungsten oxide, barium oxide, zinc oxide and magnesium oxide.

The alkaline-earth oxides are for example magnesium oxide or barium oxide.

The rare earth oxides which can be used are, for example, cerium oxide or neodymium oxide. The actinide oxides are, for example, uranium.

These different oxides can be used alone or in a mixture. They can also be used with oxides not having photocatalytic activity but which are useful as a support, for example aluminium oxide, silicon oxide etc.

The inorganic oxides can be prepared by any known method. For example, the metallic oxides can be prepared by hydrolysing a solution of alkoxides, carboxylates, halogenoalcoxides, followed by a hydrothermal treatment which results in crystallised particles forming a stable colloidal sol.

In the context of the present invention, the inorganic photocatalyst is in the form of particles dispersed in the aluminosilicate inorganic polymer binder of the imogolite type. The efficiency of the composition being directly linked with the transparency to solar radiation of the photocatalytic composition or of the photocatalytic element used, it is preferable to use particles of inorganic photocatalyst of a size below 200 nm, and preferably below 100 nm. This particle size affords good efficiency of the photocatalytic composition.

When the method of the present invention is used to treat aqueous solutions containing organic pollutants, the photocatalytic composition comprises at least one inorganic photocatalyst which is not water soluble so as to avoid the solubilisation of this oxide in the solution to be treated and, consequently, the destruction of the photocatalyst.

In treating such aqueous solutions, the inorganic photocatalyst is, for example, titanium dioxide, cerium oxide or an oxide of rare earths. According to a particular embodiment, the inorganic photocatalyst is titanium oxide in the anatase form alone or in a mixture.

The inorganic polymeric binder of the Imogolite type of the present invention is a fibrous hydrated aluminosilicate polymer which corresponds to the empirical formula $Al_xSi_yO_z$, in which x:y is between 1.5 and 2.5 and z is between 2 and 6. This aluminosilicate exists in nature; it was described for the first time by Wada in J. Soil Sci. 1979, 30(2), 347–355.

Imogolite can be synthesised using various methods. Examples of syntheses are described in U.S. Pat. Nos. 4,252,779, 4,241,035 and 4,152,404 in the name of Farmer.

Imogolite can also be synthesised using the method described in patent application WO 95/04165, filed on Oct. 24, 1995 in the name of Kodak Pathé and Eastman Kodak, which enables imogolite to be synthesised for the most part in the form of fibres. The examples illustrating the present invention were prepared according to the method described in this patent application.

This inorganic polymer binder of the Imogolite type forms, with the inorganic photocatalyst, a homogeneous dispersion, without clusters larger than 200 nm being formed, the quality of the dispersion of the inorganic oxide in the binder being directly related to the efficiency of the photocatalytic composition.

This binder also enables the particles to be trapped durably in a gel.

The aluminosilicate polymer binder of the Imogolite type is a totally inorganic binder which is therefore resistant to the action of the inorganic photocatalyst. It does not deteriorate over time.

The aluminosilicate polymer binder of the imogolite type of the present invention is therefore inert with respect to the inorganic photocatalyst, but also with respect to the organic compounds to be destroyed and the intermediate products which can be obtained in the course of destruction. It also has an affinity with the organic compounds to be destroyed so as to permit contact between these compounds to be destroyed and the active inorganic photocatalyst.

The photocatalytic composition of the invention comprises at least 5% aluminosilicate inorganic polymer of the imogolite type.

In the context of the present invention, the composition of the invention is prepared from an aluminosilicate gel of the Imogolite type, to which a colloidal solution of inorganic photocatalyst is added.

A gel is thus obtained which can be used as it is, or after lyophilisation in the form of a monolith. The gel can be applied, before drying, to a flat support made of hollow material, particles or a membrane so as to form with these a uniform, transparent layer.

It is no longer necessary, in the context of the present invention, to subject the Support:Oxide system to a high-temperature heat treatment to obtain a crystallised oxide layer, which means that a wider variety of supports can be used. The support can be an organic or glass polymer support, transparent or otherwise.

The shape of the support will be chosen according to the end use to which the photocatalytic composition will be put.

According to one embodiment, in order to treat an aqueous solution containing organic compounds to be destroyed, the photocatalytic composition in the form of a gel is mixed directly with this solution, and the mixture is then exposed to solar radiation. When all or practically all the organic compounds have been destroyed, the two phases are separated by any appropriate means, for example centrifugation, filtration or decantation.

According to another particular embodiment, it is possible to treat the aqueous solution containing the organic compounds to be destroyed by causing the solution to be treated to flow over the support covered with a layer of the inventive photocatalytic composition. The simple flow of the solution in the presence of a source of natural or artificial light significantly degrades the organic compounds to be destroyed.

For the treatment of aqueous solutions with a very high concentration of organic compounds, recycling the solution until the desired concentration of organic compounds to be destroyed is obtained can be envisaged.

According to another operating method, the photocatalytic composition, following freeze-drying, can be used in the form of a transparent monolith placed in the solution to be treated.

When gaseous solutions are treated, the gaseous solution simply needs to be put in contact with an element of the present invention in an appropriate form.

Aqueous or gaseous solutions containing the organic compounds to be destroyed, which can advantageously be treated within the scope of the present invention, are for example industrial effluents or wash water from reactors. It is possible, using this treatment method, to destroy aromatic, halogenated or hydroxylated organic compounds, carrying carboxylic functions, which are particularly stable and toxic for sewage plants.

EXAMPLES

Example 1

Synthesis of a $TiO_2$ sol

A transparent $TiO_2$ sol was prepared (a sol is colloidal system whose dispersion medium is a liquid and the dispersed phase a solid) from titanium alkoxide $Ti(OiPr)_4$. In a first step, a solution of $Ti(OiPr)_4$ in an aqueous solution (1M) was dialysed through a Spectra Por®1000 membrane. A gel of colloidal $TiO_2$ was thus obtained.

This gel was treated hydrothermally in an autoclave (180° C., 1 hour) in the presence of a peptising agent (1.74 g of $TiO_2$ in 24 ml of $H_2O$ with 54 ml of $H_2O$ and 10 ml of tartaric acid, 1M).

The X-ray diffraction spectrum having peaks characteristic of $TiO_2$ in anatase crystalline form was obtained from the sol.

Example 2

Synthesis of aluminosilicate gel of the imogolite type

To an inert reactor (polytetrafluoroethylene) containing a solution of $AlCl_3,6H_2O$ (31.2 mmol.) (manufactured by Aldrich, purity 99%) and 1000 ml of demineralised water, a solution of $Si(OEt)_4$ (16.7 mmol.) (manufactured by Ventron, purity 99%) in 1000 ml of demineralised water was added. The mixture was stirred vigorously.

After 20 mins, a solution of NaOH 1M was added gently whilst being stirred, until a pH of 4.5 was obtained. An opaque solution was thus obtained.

This solution was left for a whole night while being stirred. The pH was then adjusted to 6.8 by adding NaOH 1M.

A white gel was obtained, which was centrifuged at 2000 rpm for 20 mins. The gel was then solubilised by adding 5 ml of a mixture (50/50) of hydrochloric acid (1M) and acetic acid (2M).

To this solution was added demineralised water so that 1 litre of solution was obtained.

This solution contained 30 mmol of aluminium, 16.6 mmol of silicon, 5 mmol of hydrochloric acid and 10 mmol of acetic acid.

250 ml of this solution were drawn off and diluted in 550 ml of demineralised water. This mixture was heated for 2 hours at a temperature between 95 and 100° C., in the presence of silanol.

Every two days, 250 ml of solution (1) were added to the reactor. After 120 hrs of heat treatment, the solution was cooled. A solution of ammonia (1M) was then added, to obtain a pH of 8.0. The gel thus obtained was centrifuged for 15 mins at 2000 rpm, and the supernatant solution was eliminated.

The gel obtained was solubilised by adding a few drops of hydrochloric acid, 12 N. The solubilised gel was dialysed for several days. A thixotropic gel of Imogolite was thus obtained.

Example 3
Preparation of the photocatalytic composition

To 4 cm$^3$ (16 mg of $TiO_2$) of the colloidal solution of $TiO_2$ prepared according to the method in Example 1, 16 ml of imogolite gel from Example 2 were added.

A photocatalytic composition in the form of a gel was thus obtained.

3.1 Invention

To 20 cm$^3$ of the photocatalytic composition previously obtained in the form of a gel were added 30 ml of an aqueous solution containing 2,4-dichlorophenol (3.86 mM) as a pollutant. This mixture was exposed to solar radiation for 12 hours.

Destruction of the pollutant of around 12% was observed.

3.2 Invention

To 20 cm$^3$ of the catalytic composition previously obtained in the form of a gel were added 30 ml of an aqueous solution containing 2,4-dichlorophenol (3.86 mM) as a pollutant. This mixture was exposed to the radiation of a halogen lamp (500 W) which reproduces visible radiation, for 12 hours.

Destruction of the pollutant of around 26% was observed.

3.3 Comparison

To 20 cm$^3$ of the photocatalytic composition previously obtained in the form of a gel were added 30 ml of an aqueous solution containing 2,4-dichlorophenol (3.86 mM) as a pollutant. This mixture was placed in the dark for 12 hours.

Under these conditions, no destruction of the pollutant was observed.

3.4 Control

To 30 ml of an aqueous solution containing 2,4-dichlorophenol (3.6 mM) as a pollutant were added 20 cm$^3$ of water as a replacement for the catalytic composition.

Under these conditions, no destruction of the pollutant was observed.

Example 4

In this example, the titanium dioxide was synthesised according to the operating method in Example 1, but with the hydrothermal treatment being used so as to obtain an opaque sol. This sol was then mixed with the imogolite of Example 2. An opaque catalytic composition was thus obtained.

This composition was used as described in Example 3.2.

Destruction of the pollutant of around 11% was observed.

This example shows the efficacy of the photocatalytic composition of the present invention, even when this composition is not totally transparent to solar radiation.

Example 5
Synthesis of an amorphous $CeO_2$ sol and use of this oxide in the photocatalytic composition To 12.1 g of metallic cerium were added 150 ml of anhydrous toluene and 150 ml (1.8 mol) of 2-methoxy ethanol. This mixture was heated to 80° C. 15 mg of mercurous chloride (catalyst) were then added thereto.

It was heated to 110° C. until the metal disappears (around 12 hrs).

After cooling, the alkoxide previously obtained was hydrolysed slowly by adding water (pH=7). Following elimination of the solvents by evaporation, a suspension of cerium oxide in water was obtained. 50 ml of tartaric acid were added to this suspension and a hydrothermal treatment was performed at 200° C. for 10 hours in an autoclave.

A suspension was obtained containing 4.79 mg of cerium per cm$^3$.

To 4 cm$^3$ of this suspension were added 16 ml of a gel of Imogolite prepared according to the method in Example 2 to form the photocatalytic composition.

To this catalytic composition were added 30 ml of an aqueous solution containing 2,4-dichlorophenol (3.86 mM) as a pollutant. This mixture was exposed for 12 hours to radiation from a halogen lamp (500 W) which reproduces visible radiation.

Destruction of the pollutant of around 39% was observed.

Example 6
Photocatalytic composition containing a $TiO_2$—$CeO_2$ mixture

A photocatalytic composition was prepared by mixing 2 cm$^3$ of the $CeO_2$ suspension previously prepared, 2 cm$^3$ of the colloidal solution of $TiO_2$ from Example 1 and 16 ml of an Imogolite gel prepared according to the method of Example 2.

To this catalytic composition were added 30 ml of an aqueous solution containing 2,4-dichlorophenol (3.86 mM) as a pollutant. This mixture was exposed for 12 hours to radiation from a halogen lamp (500 W) which reproduces visible radiation.

Destruction of the pollutant of around 43% is observed.

Example 7
Other pollutants

The photocatalytic composition of Example 6 was used to treat aqueous solutions containing the organic compounds cited in the following table. The results obtained are shown in the following table.

TABLE 1

| Organic compounds to be destroyed | % of organic compounds destroyed |
| --- | --- |
| 2-chloro-5-nitrobenzoic acid (30 ml, 0.336 mM) | 48% |
| 3-4-dichlorophenol 30 ml, 0.396 mM) | 46% |

The invention has been described in detail with particular reference to certain preferred embodiments thereof, but it will be understood that variations and modifications can be effected within the spirit and scope of the invention.

We claim:

1. A homogeneous photocatalytic gel composition transparent to radiation comprising a colloidal photocatalyst having a particle size smaller than 200 nm dispersed in an imogolite gel as inorganic polymer binder.

2. The composition according to claim 1, in which the imogolite gel is predominantly in the form of fibres.

3. The composition according to claim 1, in which the colloidal photocatalyst is selected from the group consisting of a metallic oxide, an alkaline-earth oxide, a rare earth oxide or an actinide oxide.

4. Composition according to claim 1, in which at least one of the colloidal photocatalysts is titanium dioxide anatase.

5. Composition according to claim 1, in which at least one of the colloidal photocatalysts is cerium oxide.

6. Composition according to claim 1, in which at least one of the colloidal photocatalysts is amorphous cerium oxide.

7. The composition according to claim 1, in which the quantity of Imogolite gel is at least 5% of the total weight of the composition.

8. Photocatalytic element comprising a support covered with a layer consisting of the catalytic composition as defined according to claim 1.

9. Photocatalytic element according to claim 8, in which the support is an organic or glass polymer support.

10. A process for obtaining a transparent photocatalytic gel composition comprising:
 homogeneously dispersing in an imogolite gel, a colloidal photocatalyst sol having a particle size smaller than 200 nm, and optionally drying said photocatalytic gel composition.

11. The process of claim 10 comprising applying the photocatalytic gel to a support before drying.

* * * * *